United States Patent Office 3,364,180
Patented Jan. 16, 1968

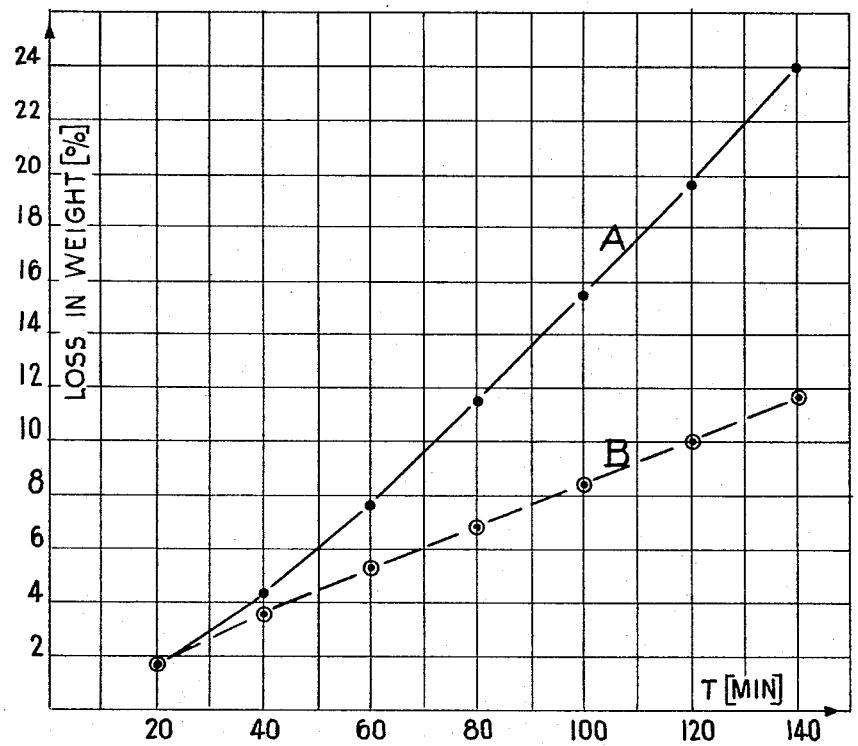

3,364,180
PROCESS FOR PREPARING COPOLYMERS OF CYCLIC ACETALS AND ACRYLONITRILE
Klemens Gutweiler, Mainz (Rhine), and Klaus Küllmar, and Edgar Fischer, Frankfurt am Main, Germany, assignors to Farbwerke Hoechst Aktiengesellschaft vormals Meister Lucius & Bruning, Frankfurt am Main, Germany, a corporation of Germany
Filed Nov. 9, 1961, Ser. No. 151,374
Claims priority, application Germany, Nov. 12, 1960, F 32,536
15 Claims. (Cl. 260—73)

The present invention relates to high molecular weight, thermoplastic copolymers of cyclic acetals and acrylonitrile and to a process for preparing them.

Cyclic acetals can be transformed, under the action of cationic catalysts, into polymers of high molecular weight. In the polymerization of trioxane high molecular weight products are obtained having the structural formula:

$$HOCH_2-(-OCH_2-)_x-OCH_2OH$$

These polyacetals carrying terminal semi-acetal groups are thermally unstable, because starting at the semi-acetal groups they depolymerize with the evolution of free formaldehyde. The thermostability of said polyoxymethylenes can be considerably improved by a chemical after treatment wherein the hydroxyl groups of the terminal semi-acetal groups are blocked. However, the stabilization achieved by blocking the terminal groups is not sufficient for producing polymers that can be used on a large industrial scale. If the polymer chain of a polyoxymethylene molecule, the terminal groups of which have been stabilized, is split somewhere, depolymerization again sets in at the breaking points. The splitting of the polymer chain may occur as a secondary reaction of an oxidation or as a result of a purely mechanical or thermal treatment.

Polymers of cyclic acetals can be further stabilized by the addition of special stabilizers (antioxidants). Still further it has been proposed to produce polymers having an improved stability by copolymerizing cyclic acetals, for example trioxane, with a comonomer.

The improved thermostability of such copolymers as compared with homopolymers of cyclic acetals, for example the homopolymer of trioxane, is attributed to the structural modification of the polymer chain. A progressive splitting off of formaldehyde starting at a chain end can only take place as long as the polymer chain has the uniform structure indicated above. When an organic radical R' having two or more adjacent carbon atoms is incorporated into the polymer chain, the splitting off of formaldehyde can only progress to the point shown by the following formula:

$$-OCH_2-(OCH_2)_m-R'-(OCH_2)_n-OCH_2OR \rightarrow$$
$$(m+1)CH_2O+R'-(OCH_2)_n-OCH_2OR$$

Consequently the incorporation of the organic radical R' into the polymer chain improves the thermostability.

It has now been found that the copolymerization, under the action of a cationic catalyst, of cyclic acetals, for example trioxane, with acrylonitrile yields high molecular weight products which have a considerably improved thermostability as compared with homopolymers of cyclic acetals. In the process of the invention the proportion of the monomers, i.e. of the cyclic acetal to the acrylonitrile, generally varies between 100:1 and 100:25 and preferably between 100:2 and 100:10 parts by weight.

The improved thermostability of the copolymers of the invention is illustrated by the accompanying drawing. The loss in weight percent is plotted as a function of the time at 202° C. for two polymers produced under identical conditions. Curve A represents the loss in weight of a trioxane homopolymer and curve B shows the loss in weight of a copolymer obtained by copolymerizing 100 grams of trioxane and 2 grams of acrylonitrile. After a thermal treatment at 202° C. for 2 hours the loss in weight of the copolymer is only about 50% of the loss in weight of the corresponding homopolymer of pure trioxane.

The considerably improved thermostability of the copolymers as compared with the pure homopolymer of pure trioxane can especially be observed on a prolonged thermal treatment. After having been heated for 2 hours at 202° C., the homopolymer forms at said temperature a mobile liquid while the copolymer still keeps its highly viscous consistency at 202° C. after a three-hour treatment.

Moreover, the copolymers made with acrylonitrile are tougher than the homopolymers of cyclic acetals, which is perceptible by the bending strength of the corresponding films.

In addition to improving the aforementioned properties a polymerization of cyclic acetals in the presence of acrylonitrile yields, in comparison with a homopolymerization of cyclic acetals conducted under identical conditions, products having a higher molecular weight which can be determined by measuring the reduced viscosity ($\eta_{spec.}/c$).

TABLE 1.—VISCOSITY OF THE COPOLYMERS AS A FUNCTION OF THE AMOUNT OF ACRYLONITRILE ADDED

| Experiment | Catalyst | Amount of catalyst per 100 g. trioxane | Amount of acrylonitrile per 100 g. trioxane (gram) | $\eta$ spec./C. |
|---|---|---|---|---|
| 1a | $(O_2N-\langle\ \rangle-N_2)BF_4$ | 10 mg | | 0.66 |
| 1b | Same as above | 10 mg | 2 | 0.98 |
| 1c | do | 10 mg | 5 | 1.00 |
| 2a | do | 10 mg | | 0.59 |
| 2b | do | 10 mg | 2 | 0.87 |
| 2c | do | 10 mg | 5 | 0.92 |
| 3a | do | 10 mg | | 0.57 |
| 3b | ACN + HBF$_4$(0.0035 ml. HBF$_4$ per gram ACN). | 2g | | 0.79 |
| 3c | do | 2g | 3 | 0.93 |

In general the melting points of the copolymers of the invention are in the range of 180° C. to 190° C.

The fact that in the novel process a copolymerization with the acrylonitrile takes place can be proved by the nitrogen content of the products which have been purified by repeated reprecipitation.

The monomers used in the process of the invention for the manufacture of high molecular weight copolymers must be free from impurities which, on the one hand, react irreversibly with the catalyst and, on the other, may act as chain interrupting or chain transfer agents. Especially the acrylonitrile must be carefully purified, depending on the manufacturing method, to eliminate, for example, vinyl ketones, basic compounds and water.

As cationically active catalysts there can be used those compounds which can take up one or more electron pairs in an incomplete valence shell of one of their atoms. Suitable catalysts are thus compounds which can be considered as electron acceptors or Lewis acids (cf. Kortüm, Lehrbuch der Elektrochemie, Wiesbaden 1948, pages 300 and 301). From among the great number of inorganic compounds known as Lewis acids and active as polymerization catalysts there are mentioned by way of example $BCl_3$, $AlCl_3$, $FeCl_3$, $SbCl_3$, $SbCl_5$, $ZnCl_2$, $SnCl_4$, $TiCl_4$ and preferably $BF_3$.

For initiating the polymerization there may likewise be used complex compounds of Lewis acids, for example the etherates or amino complex compounds or the complex compounds of acrylonitrile and Lewis acids.

It has surprisingly been found that also a mixture of acrylonitrile and fluoboric acid starts the polymerization after a short while.

Catalysts which are likewise very active in the process of the invention and the use of which is preferred on account of their easy handling dosability are salts of Lewis acids, for example the oxonium salts such as trimethyl-, triethyl-, tri-n-propyl-oxonium-fluoborate, methyltetramethylene-oxonium - fluoborate, ethyltetramethylene-oxonium-fluoborate, methyl- or ethyl-pentamethylene-oxonium-fluoborate, the oxonium salts of dimethylpyrone, cumarine and camphor, furthermore the oxonium salts of analogous structure or inner oxonium salts of iron, antimony or tin, for example trialkyl-oxonium-tetrachloroferriate, trialkyl-oxonium-hexachloroantimonate or bis-trialkyl-oxonium-hexachlorostannate.

Further suitable catalysts are the complex compounds of Lewis acids with inorganic acids.

In the process of the invention it is especially suitable to use for initiating the polymerization substituted aryldiazonium-fluoborates. These compounds can be readily prepared in the required purity. They are solid, very stable products which allow of an exact dosage and are very well soluble in the monomer melt.

The polymerization sets in after a certain time of induction. The time of induction depends on the rate of decomposition of the diazonium-fluoborates at the polymerization temperature or on the dissociation constant of the complex compounds at said temperature.

Suitable monomer-soluble phenyldiazonium-fluoborates are those which carry in any position of the aromatic nucleus one or several substituents, for example alkyl groups such as the methyl, ethyl, propyl, butyl or hexyl group; unsubstituted or substituted cycloalkyl groups such as the cyclohexyl group or a substituted cyclohexyl group; aryl groups such as the phenyl or naphthyl group; alkoxy groups with 1–8 carbon atoms, the phenoxy group, halogen atoms, preferably chlorine atoms, ester groups, the nitrile group, alkylsulfonyl groups, sulfonamide groups, or arylazo groups.

Further suitable diazonium fluoborates can be derived from aromatic substances such as fluorene, carbazole and anthraquinone.

The following aryldiazonium-fluoborates are given by way of example:

(α) Light-active diazonium salts

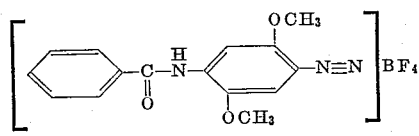

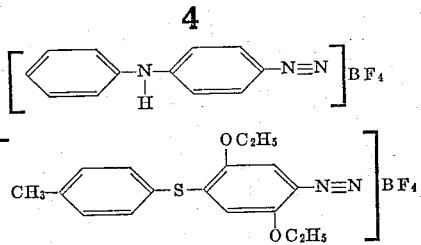

(β) thermo-active diazonium salts which can simultaneously be activated by light

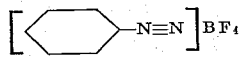

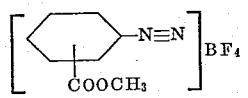

the radical —$COOCH_3$ standing in ortho, meta or para-position

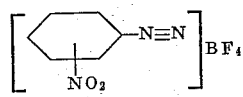

the —$NO_2$-group standing in ortho, meta or para-position.

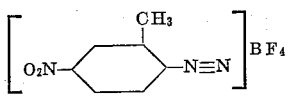

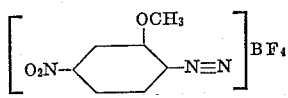

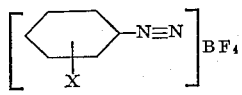

X representing halogen, preferably F or Cl in ortho, meta or para-position.

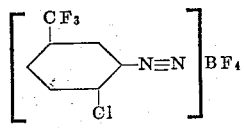

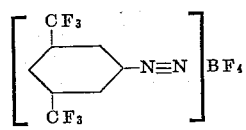

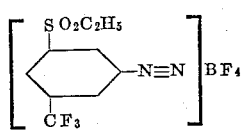

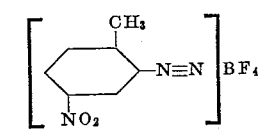

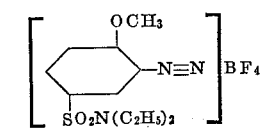

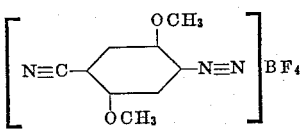

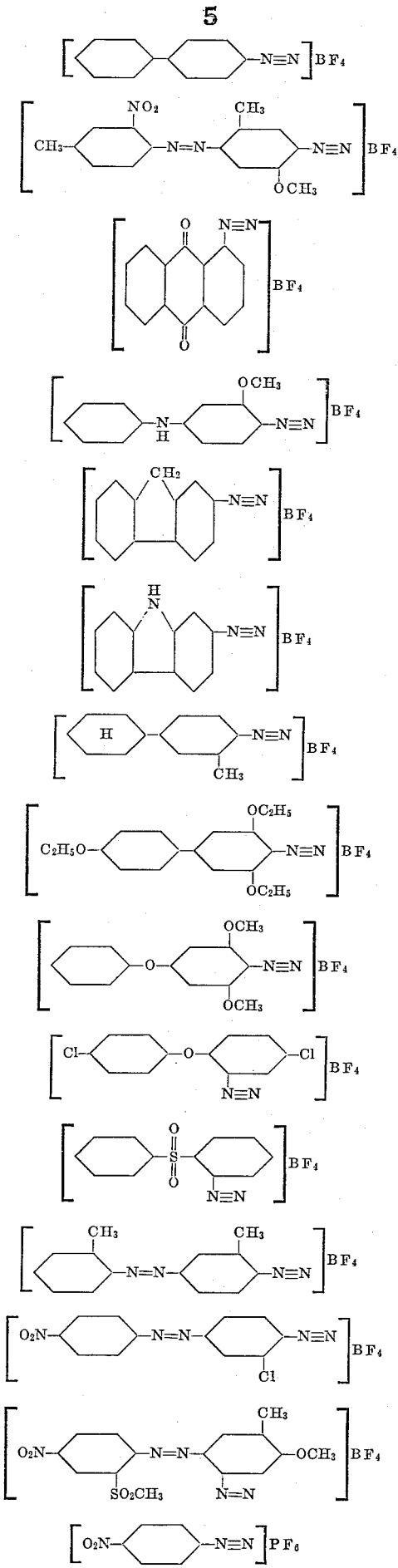

The catalyst is preferably added in an amount of 0.0001 to 1.0 mole percent, suitably 0.001 to 0.1 mol percent, calculated on the trioxane used. Since the rate of polymerization increases with an increasing amount of catalyst, the latter must be chosen in a manner such that the polymerization heat evolved can be easily eliminated.

The copolymerization of trioxane with acrylonitrile can be carried out in the melt, in solution or in the solid state. The polymerization in solution is carried out in an inert solvent in which the monomers are soluble. Suitable inert solvents are, for example, cyclic hydrocarbons such as cyclohexane; saturated aliphatic hydrocarbons such as hexane, heptane, or isooctane; substituted saturated aliphatic hydrocarbons such as carbon tetrachloride or nitroethane. Mixtures of inert solvents can likewise be used.

For the polymerization in the solid state the acrylonitrile is suitably dissolved in the molten trioxane and the solution is allowed to solidify by cooling it at a temperature below the melting point. The solid crystals are then charged with gaseous boron trifluoride and the polymerization is carried out at a temperature preferably below 79° C.

The polymerization temperature can vary within wide limits; depending on the polymerization process it can range from about −100° C. to +150° C. In general the polymerization is carried out at a temperature in the range of −70° C. to +79° C. When operating at a temperature above the boiling point of acrylonitrile, it is necessary to conduct the polymerization in an autoclave. The polymerization in the melt is preferably carried out at a temperature in the range of 65° C. to 75° C.

For processing the copolymer is comminuted and boiled for about one hour with methanol containing 1% by volume of ethanolamine. The polymer is then filtered off with suction, after-washed with methanol and dried for about 20 hours at 70° C.

The copolymer is suitably reprecipitated by dissolving it in hot butyrolactone or benzyl alcohol and stirring the hot solution into methanol.

The reduced viscosity is determined with a 0.5 weight percent solution of the copolymer in butyrolactone at 140° C. The butyrolactone contains 2% by weight of diphenylamine.

The copolymers obtained by the process of the invention can be processed in the thermoplastic state and are suitable, inter alia, for the manufacture of foils, films, bands and various injection molded articles.

The following examples serve to illustrate the invention but they are not intended to limit it thereto, the parts being by weight unless otherwise stated.

*Example 1*

0.01 part of p-nitrophenyl-diazonium-fluoborate was added to a mixture of 100 parts of molten trioxane and 2 parts of acrylonitrile. The catalyst dissolved at once. The polymerization vessel was closed and allowed to stand for 2 hours 70° C. During this time the solution solidified to a white solid polymer block.

For processing the polymer block was comminuted and finely ground. The powder obtained was boiled for one hour with 250 cc. of methanol and 2.5 cc. of ethanolamine, filtered off with suction and repeatedly washed with methanol. The polymer was dried for 20 hours at 70° C. It had a reduced viscosity ($\eta_{sp.}/c.$) of 0.98. The loss in weight at 202° C. was 0.089% per minute (measured over a period of 140 minutes).

Example 2

0.02 part of p-nitrophenyl-diazonium-fluoborate was added to a mixture of 200 parts of molten trioxane and 10 parts of acrylonitrile. The polymerization was conducted for 2 hours at 70° C. The solid polymer block was processed as described in Example 1.

The product had a reduced viscosity ($\eta_{sp.}/c$) of 1.00. The loss in weight at 202° C. was 0.082% per minute (measured over a period of 140 minutes).

Example 3

0.88 cc. of a 10% solution of boron trifluoride dibutyl etherate in dibutyl ether was added to a mixture of 100 parts of molten trioxane and 10 parts of acrylonitrile. The polymerization was conducted for 2 hours at 70° C. The solid polymer block obtained was processed as described in Example 1.

The product had a reduced viscosity ($\eta_{sp.}/c$) of 0.90. The loss in weight, measured at 202° C. over a period of 140 minutes, was 0.080% per minute.

Example 4

6 parts of a complex compound of acrylonitrile and boron trifluoride, obtained by introducing 15 parts by volume of boron trifluoride into 10 parts of acrylonitrile, were added to a solution of 9 parts of acrylonitrile in 300 parts of molten trioxane. Polymerization set in after a very short time. The polymerization was conducted for 2 hours at 70° C. The polymer block was processed as described in Example 1.

The product had a reduced viscosity ($\eta_{sp.}/c$) of 0.98 and a loss in weight at 202° C. of 0.085% per minute, measured over a period of 140 minutes.

Example 5

6 parts of a mixture of 20 parts of acrylonitrile and 0.07 parts by volume of fluoboric acid of about 33% strength in water were added to 300 parts of molten trioxane. The polymerization set in after a very short time and lasted 2 hours at 70° C. The solid polymer block was processed as described in Example 1. The polymer had a reduced viscosity ($\eta_{sp.}/c$) of 0.79.

Example 6

6 parts of a mixture of 20 parts of acrylonitrile and 0.07 part by volume of fluoboric acid of about 33% strength in water were added to a mixture of 300 parts of molten trioxane and 9 parts of acrylonitrile. Polymerization set in after a very short time and lasted 2 hours at 70° C. The solid polymer block was processed as described in Example 1. The polymer had a reduced viscosity ($\eta_{sp.}/c$) of 0.93.

We claim:

1. A process for the manufacture of copolymers of high molecular weight, which comprises the step of copolymerizing 100 parts by weight of trioxane and 1–25 parts by weight of acrylonitrile in admixture with at least one cationically active catalyst at a temperature within the range of about −100° C. to about +150° C.

2. A process for the manufacture of copolymers of high molecular weight, which comprises the step of copolymerizing 100 parts by weight of trioxane and 1–25 parts by weight of acrylonitrile in admixture with 0.0001 to 1 mol percent, calculated upon the trioxane, of at least one cationically active catalyst at a temperature within the range of −100° C. to +150° C.

3. A process as claimed in claim 2, wherein 0.001 to 0.1 mol percent of a cationically active catalyst are used.

4. A process for the manufacture of copolymers of high molecular weight, which comprises the step of copolymerizing 100 parts by weight of trioxane and 1–25 parts by weight of acrylonitrile in admixture with 0.0001 to 1 mol percent, calculated upon the trioxane, of at least one Lewis acid at a temperature within the range of −100° C. to +150° C.

5. A process for the manufacture of copolymers of high molecular weight, which comprises the step of copolymerizing 100 parts by weight of trioxane and 1–25 parts by weight of acrylonitrile in admixture with 0.0001 to 1 mole percent, calculated upon the trioxane, of at least one member selected from the group consisting of $AlCl_3$, $BCl_3$, $FeCl_3$, $SbCl_3$, $SbCl_5$, $ZnCl_2$, $SnCl_4$, $TiCl_4$ and $BF_3$ at a temperature within the range of −100° C. to +150° C.

6. A process for the manufacture of copolymers of high molecular weight, which comprises the step of copolymerizing 100 parts by weight of trioxane and 1–25 parts by weight of acrylonitrile in admixture with 0.0001 to 1 mole percent, calculated upon the trioxane, of boron-trifluoride at a temperature within the range of −100° C. to +150° C.

7. A process for the manufacture of copolymers of high molecular weight, which comprises the step of copolymerizing 100 parts by weight of trioxane and 1–25 parts by weight of acrylonitrile in admixture with 0.0001 to 1 mol percent, calculated upon the trioxane, of at least one complex compound of a Lewis acid and a member selected from the group consisting of ether, amine, acrylonitrile and inorganic acid at a temperature within the range of −100° C. to +150° C.

8. A process for the manufacture of copolymers of high molecular weight, which comprises the step of copolymerizing 100 parts by weight of trioxane and 1–25 parts by weight of acrylonitrile in admixture with 0.0001 to 1 mol percent, calculated upon the trioxane, of at least one Lewis acid in an ionic form at a temperature within the range of −100° C. to +150° C.

9. A process for the manufacture of copolymers of high molecular weight, which comprises the step of copolymerizing 100 parts by weight of trioxane and 1–25 parts by weight of acrylonitrile in admixture with 0.0001 to 1 mole percent, calculated upon the trioxane, of at least one oxonium salt of a Lewis acid at a temperature within the range of −100° C. to +150° C.

10. A process for the manufacture of copolymers of high molecular weight, which comprises the step of copolymerizing 100 parts by weight of trioxane and 1–25 parts by weight of acrylonitrile in admixture with 0.0001 to 1 mol percent, calculated upon the trioxane, of at least one diazonium salt of a Lewis acid at a temperature within the range of −100° C. to +150° C.

11. A process for the manufacture of copolymers of high molecular weight, which comprises the step of copolymerizing 100 parts by weight of trioxane and 1–25 parts by weight of acrylonitrile in admixture with 0.0001 to 1 mole percent, calculated upon the trioxane, of at least one aryl-diazonium salt of a Lewis acid at a temperature within the range of −100° C. to +150° C.

12. A process for the manufacture of copolymers of high molecular weight, which comprises the step of copolymerizing 100 parts by weight of trioxane and 1–25 parts by weight of acrylonitrile in admixture with 0.0001 to 1 mol percent, calculated upon the trioxane, of at least one light-active aryl-diazonium salt of a Lewis acid at a temperature within the range of −100° C. to +150° C.

13. A process for the manufacture of copolymers of high molecular weight, which comprises the step of copolymerizing 100 parts by weight of trioxane and 1–25 parts my weight of acrylonitrile in admixture with 0.0001 to 1 mole percent, calculated upon the trioxane, of at least one thermo-active aryl-diazonium salt of a Lewis acid at a temperature within the range of −100° C. to 150° C.

14. A process for the manufacture of copolymers of high molecular weight, which comprises the step of copolymerizing 100 parts by weight of trioxane and 1–25 parts by weight of acrylonitrile in admixture with 0.0001 to 1 mole percent, calculated upon the trioxane, of at least one light-active aryl-diazonium-fluoroborate at a temperature within the range of −100° C. to +150° C.

15. A process for the manufacture of copolymers of high molecular weight, which comprises the step of copolymerizing 100 parts by weight of trioxane and 1–25 parts by weight of acrylonitrile in admixture with 0.0001 to 1 mole percent, calculated upon the trioxane of at least one thermo-active aryl-diazonium-fluoroborate at a temperature within the range of −100° C. to +150° C.

References Cited

UNITED STATES PATENTS

| | | | |
|---|---|---|---|
| 3,069,402 | 12/1962 | Smart | 260—88.7 |
| 3,076,786 | 2/1963 | Brown et al. | 260—67 |
| 3,087,913 | 4/1963 | Kray et al. | 260—67 |
| 2,946,760 | 7/1960 | De Witt et al. | 260—73 |

FOREIGN PATENTS

| | | |
|---|---|---|
| 585,980 | 6/1960 | Belgium. |

OTHER REFERENCES

Okamura et al.: "Gamma-ray Induced Polymerization of Formaldehyde," Isotopes and Radiation, vol. 3, No. 3, 1960, pp. 242–243.

Okamura et al.: "Radiation Inducted Polymerization of Trioxane," Isotopes and Radiation, vol. 3, No. 5, September 1960, pp. 416–418.

Walker: "Formeldehyde," 2nd edition, 1953, published by Reinhold, N.Y., pp. 319–320.

"The Chemistry of Acrylonitrile," 2nd ed., p. 30, published by American Cyanamid Co., Petrochemicals Dept., 1959.

Staudinger: "Polyoxymethylene," Angew Chem./73, 1961 (March), No. 6, pp. 177–186.

JAMES A. SEIDLECK, *Primary Examiner.*

H. N. BURSTEIN, *Examiner.*

W. G. GOODSON, *Assistant Examiner.*